United States Patent [19]

Fischer et al.

[11] 3,773,305
[45] Nov. 20, 1973

[54] CATHODIC PROTECTION DEVICE FOR MARINE CARBURETORS

[75] Inventors: Earl R. Fischer; Rushmore R. Valentine, Jr., both of Rochester, N.Y.

[73] Assignee: General Motors Corporation, Detroit, Mich.

[22] Filed: June 5, 1972

[21] Appl. No.: 259,455

[52] U.S. Cl. ............................................. 261/72 R
[51] Int. Cl. .......................................... F02m 17/40
[58] Field of Search ................................. 261/72 R

[56] References Cited
UNITED STATES PATENTS
2,615,694   10/1952   Olson ............................ 261/23 A

*Primary Examiner*—Tim R. Miles
*Attorney*—J. L. Carpenter et al.

[57] ABSTRACT

A cathodic protection device for marine carburetors wherein the gasket for the power valve of the carburetor is made of a conducting material, such as aluminum, with a sacrificial cathode material secured thereto.

2 Claims, 3 Drawing Figures

PATENTED NOV 20 1973

3,773,305

CATHODIC PROTECTION DEVICE FOR MARINE CARBURETORS

This invention relates to carburetors and, in particular, to a cathodic protection device for marine carburetors.

Due to economic considerations, carburetors for use on internal combustion engines are normally made with zinc die-cast carburetor housing components and the fittings used within the carburetor are normally made of brass, although aluminum may also be used by some manufacturers in lieu of the zinc. Thus, most carburetors on the market today are fabricated using at least two dissimilar metals, such as zinc and brass, and under most operating conditions, the use of such dissimilar metals creates no special problems.

However, when such carburetors are used in marine applications, especially in salt water, corrosion of various components of the carburetors may occur to the extent that it may be necessary to replace the carburetor because of such corrosion problems. This is due to the fact that operation of such a carburetor in a salt water marine environment entails the probability of ingestion of salt particles carried in a spray mist. Under normal operating conditions, with the engine in operation, this mist of salt water will mix and be carried through the intake manifold and into the cylinders of the engine to be ejected as steam and ash or acid. However, when the engine is shut down, the salt and moisture in the air space above the fuel reservoir of the carburetor, that is the float bowl, will condense and enter the fuel in the float bowl. The salt water will separate out and pass through the fuel in the float bowl to lie in the lowermost portions of the float bowl due to the differences in density between that of the fuel and the salt containing water.

The salt water thus lying in the bottom of the float bowl creates an electrolytic cell in which an oxidation or reduction action takes place between, for example, the float bowl made of zinc and the various submerged brass fittings in the float bowl of the carburetor. This reaction continues so long as ions are available in the salt water and can be accelerated by elevated temperature, and reduced exposed area of the oxidizing element or increased area of the reducing element.

It is therefore the principal object of this invention to provide a carburetor for marine use with a cathodic protection device therein to protect the functional material of the carburetor per se.

Another object of this invention is to provide a carburetor for marine use by providing a gasket for the power valve of the carburetor made of conductive material with a sacrificial cathode material secured thereto.

A still further object of this invention is to provide a cathodic protection device which can be easily incorporated into existing carburetors for use in marine applications.

These and other objects are attained by the use of a gasket for the power valve of a carburetor made of a conducting material with the sacrificial cathode material secured thereto.

For a better understanding of the invention, as well as other objects and further features thereof, reference is had to the following detailed description of the invention to be read in connection with the accompanying drawings, wherein.

Figure 1:
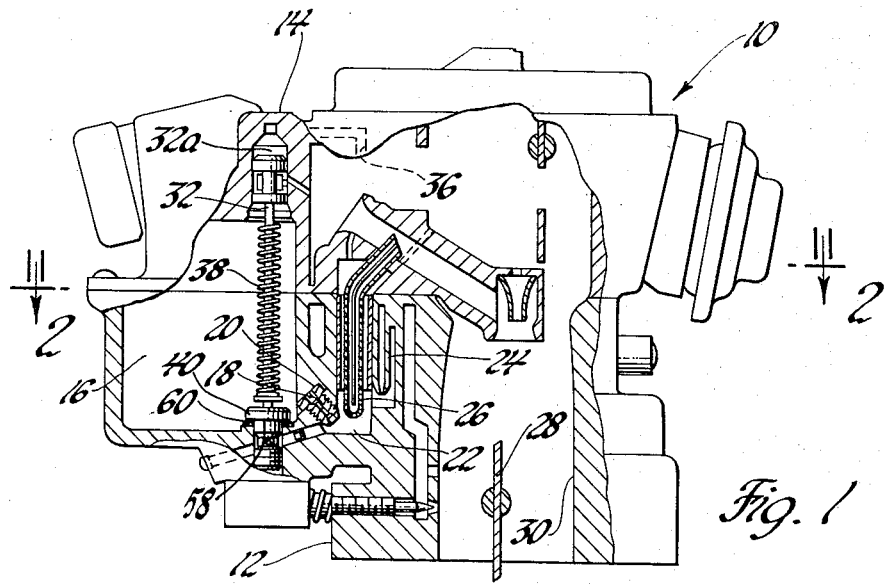
FIG. 1 is a view of a conventional two-barrel carburetor with parts broken away to show details of its construction.

With reference to FIG. 1, there is shown a conventional two-barrel carburetor 10 not shown in detail since the specifics of this carburetor form no part of the subject invention. The carburetor 10 may be of the type disclosed in U.S. Pat. No. 2,615,694 issued Oct. 18, 1952 to Elmer Olsen and includes a lower housing 12 and an upper housing 14 to provide an enclosed float bowl 16 suitably internally vented by a vent tube, not shown, which leads from inside the bore of the air horn within the upper housing 14 to the top of the fuel in the float bowl. The carburetor is thus internally balanced through this internal vent because the same pressure causing air to flow through the induction passage in the carburetor will be acting upon the top of the fuel in the float bowl 16 causing fuel to flow. As is common commercial practice, the lower housing 12 and the upper housing 14 are formed, for example, as zinc castings.

Fuel from the float bowl 16 is delivered through the main metering jets, each formed by an orifice 18 in a plug 20 threaded into threaded apertures in the lower wall of the float bowl in housing 12, into the main fuel well 22 for delivery via the idle tube 24 or main well tube 26 to the throttle 28 controlled induction passage 30 in a conventional manner depending on engine operating conditions.

In addition, to achive the proper air-fuel mixtures when more power is desired or for extreme high speed driving, a vacuum operated power piston 32 in the air horn and a power valve 34 located in the bottom wall of the float bowl are used to deliver additional fuel to the main well. Through a connecting vacuum passage 36 from the base of the carburetor to the power piston cylinder 32a in the upper housing 14, the power piston is exposed to manifold vacuum at all times, a spring 38 being used to normally bias the power piston downward. The power piston is used to effect operation of the power valve 34 positioned within an apertured bushing 40 secured at the bottom of the fuel bowl. The bushing 40 has side openings 42 connecting the bore 44 in which the bushing is positioned with a central opening 46 extending through a valve seat 48 normally engaged by the power valve 34 which is urged upward by a spring 50 retained by an apertured cup-shaped bushing 52 within the bushing 40.

In response to demand for increased engine power, the power valve 34 is caused to move down by the spring 38 loaded power piston 32 which is responsive to a decrease in engine intake suction. Fuel passing through the side openings 42 into the bore 44 is metered by an orifice in a bushing 54 pressed into a passage 56 in communication with the main well 22. As seen clearly in FIG. 1, the bushing 40 is provided with an annular flange 58 to engage a gasket or seal washer 60.

Figure 2:
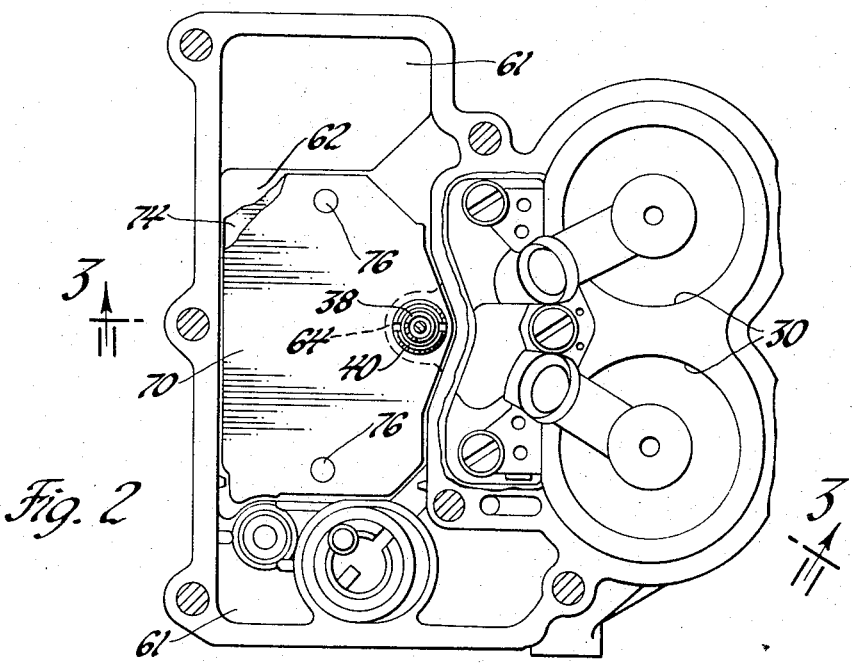
FIG. 2 is a view taken along line 2—2 of FIG. 1 showing the carburetor of FIG. 1, but with a cathodic protection device in accordance with the invention mounted within the float bowl of the carburetor; and, FIG. 3 is an enlarged sectional view of a portion of the carburetor of FIG. 2 taken along line 3—3 of FIG. 2.

Referring now to FIG. 2 in addition to FIG. 1, the bottom of the fuel bowl is formed by two portions, the shallow bottom wall portion 61 and a deep bottom wall portion 62 to define a centrally disposed recess within the fuel bowl. At one side of the fuel bowl adjacent to the two induction passages is a raised bottom wall portion 64 to provide a plateau for the apertured bushing 40.

In the carburetor structure described above, elements such as the plug 20 and the bushing 40, for example, are conventionally made of brass. Thus, it can be seen that in a conventional carburetor, as illustrated in FIG. 1, if salt water from a salt water spray or other means enters the float bowl of the carburetor and settles to the bottom thereof, this salt water will form an electrolyte which will be in contact with two dissimilar metals, that is the zinc or aluminum of the lower housing 12 and the brass in fittings such as the plug 20 and bushing 40. Corrosion will then occur with accelerated local concentration cell corrosion occurring at the junction between these dissimilar metals, in particular at their threaded interconnections. If this occurs repeatedly, sufficient corrosion will result to adversely affect the operation of the carburetor to the extent that replacement of the entire carburetor may be required.

Figure 3:
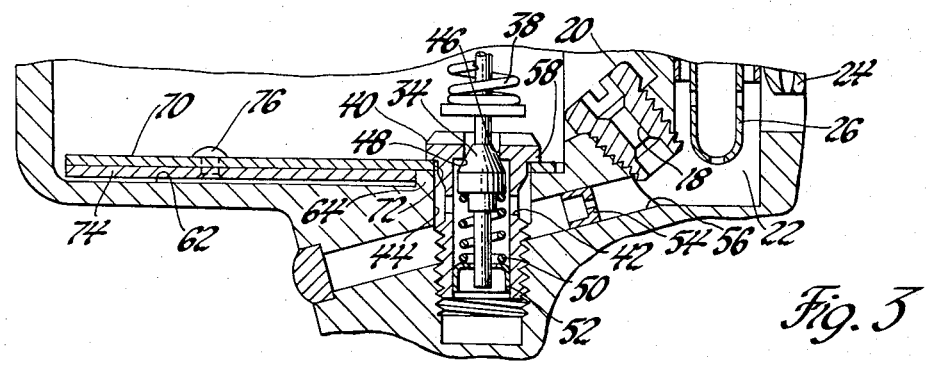

Now in accordance with the invention, there is provided a cathodic protection device which is ideally suited for use in carburetors intended for marine use. As best seen in FIGS. 2 and 3, a support panel 70, of conductive gasket material, such as aluminum or other material more noble than the material of the sacrificial anode 74, is provided at one end with an aperture 72 of a diameter to slidably receive the lower portion of the bushing 40 so as to form a seal gasket or washer between the annular flange 58 of the bushing and the raised wall portion 64 at the bottom of the float bowl. This aluminum panel forms, in effect, an enlarged seal washer to replace the seal washer 60 of the type shown in FIG. 1 and, in addition, it is used as an electrical contact between the carburetor components and a sacrificial galvanic anode and, a support and protective cover for the anode, as will be described. As shown, the aluminum panel extends out over the lower wall portion 62 of the fuel bowl and is spaced upward therefrom.

To complete the cathodic protection device, a sacrificial anode 74, in the form of a plate of magnesium or a magnesium alloy, is then secured by aluminum rivets 76 to the underside of the aluminum plate. As best seen in FIG. 2, the support panel 70 and the anode 74 are contoured to closely fit the shape of the fuel bowl so as to completely overlie the lower bottom wall portion 62 with only sufficient clearance with the side wall of the float bowl to allow electrolyte communication with the sacrificial anode 74.

While a sacrificial anode may be securely attached initially, it tends to be consumed more rapidly at areas adjacent to their metal supports, such as rivets 76 to the support panel 70, and if this deterioration is allowed to continue to near depletion, the worn anode is easily dislodged and may fall from its support. However, in the arrangement illustrated, the sacrificial anode 74 is retained in the well at the bottom of the float bowl 16 by means of the support panel 70 which in effect encloses the anode within this well portion at the bottom of the float bowl.

The cathodic protection device of the subject invention can be readily installed as part of a new carburetor or in a used carburetor, since the support panel of this device can form the gasket of the existing power valve, replacing the original seal washer 60.

What is claimed is:

1. A cathodic protection device for a carburetor of the type having a housing providing a fuel bowl with a recessed bottom wall in a portion thereof and a shouldered fuel discharge means threaded in the bottom thereof, said cathodic protection device including a support panel of conductive gasket material, a sacrificial anode and, fastener means securing said anode to said support panel, said support panel having an aperture therein whereby said support panel is secured by said shouldered fuel discharge means within the fuel bowl, said support panel forming a gasket between the shoulder of said fuel discharge means and the bottom of the housing within the fuel bowl, said support panel and said sacrificial anode being of a shape to conform to the configuration of the recessed bottom wall of the fuel bowl with the support panel being positioned over the sacrificial anode.

2. A cathodic protection device according to claim 1 wherein said support panel and said fastener means are of aluminum and wherein said sacrificial anode is of a magnesium alloy.

* * * * *